United States Patent
Yamamoto et al.

(10) Patent No.: US 6,801,397 B2
(45) Date of Patent: *Oct. 5, 2004

(54) GLASS SUBSTRATE FOR A MAGNETIC DISK, A MAGNETIC DISK WHICH CAN BE FORMED WITH A STABLE TEXTURE AND A MAGNETIC DISK DEVICE

(75) Inventors: Hiroki Yamamoto, Hitachi (JP); Takashi Namekawa, Hitachi (JP); Takashi Naito, Hitachiohta (JP); Yasutaka Suzuki, Jyuou-machi (JP); Akira Kato, Odawara (JP); Noriyuki Takeo, Yamakita-machi (JP); Kiyoshi Akamatsu, Yokohama (JP); Youichi Inomata, Odawara (JP); Masatomo Terakado, Mobara (JP); Ken Takahashi, Tokai-mura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/408,444

(22) Filed: Apr. 8, 2003

(65) Prior Publication Data

US 2003/0202280 A1 Oct. 30, 2003

Related U.S. Application Data

(63) Continuation of application No. 09/795,085, filed on Mar. 1, 2001, now Pat. No. 6,577,472, which is a continuation of application No. 09/121,531, filed on Jul. 24, 1998, now abandoned.

(30) Foreign Application Priority Data

Jul. 24, 1997 (JP) ............................................. 9-198184

(51) Int. Cl.$^7$ ................................................ G11B 5/82
(52) U.S. Cl. ...................................................... 360/135
(58) Field of Search .......................... 360/135; 428/64.1, 428/64.2, 64.3, 64.4, 65.3, 694 RR, 694 ST, 694 SG

(56) References Cited

U.S. PATENT DOCUMENTS

| | | | | |
|---|---|---|---|---|
| 5,726,108 A | * | 3/1998 | Taguchi et al. | ................. 501/5 |
| 5,820,960 A | * | 10/1998 | Kwon | ....................... 428/64.1 |
| 6,040,029 A | * | 3/2000 | Yamamoto et al. | ......... 428/64.1 |
| 6,577,472 B2 | * | 6/2003 | Yamamoto et al. | .......... 360/135 |

* cited by examiner

Primary Examiner—David Davis
(74) Attorney, Agent, or Firm—Antonelli, Terry, Stout & Kraus, LLP

(57) ABSTRACT

A glass substrate for a magnetic disk contains a transition metal. The substrate, which is subjected to formation of zone texturing by irradiating the substrate with a laser beam, has a high mechanical strength even if it is not chemically strengthened. The glass substrate contains a transition metal element and has a transmittance of 10% or less for light in a wavelength range of 300 to 2000 nm. The surface roughness of an information recording surface portion thereof is 2.0 nm or less. In addition to a transition metal element, the glass substrate may include a rare earth metal element.

15 Claims, 6 Drawing Sheets

GLASS SUBSTRATE FOR A MAGNETIC DISK, A MAGNETIC DISK WHICH CAN BE FORMED WITH A STABLE TEXTURE AND A MAGNETIC DISK DEVICE

This application is a continuation of U.S. Ser. No. 09/795,085, filed Mar. 1, 2001, now U.S. Pat. No. 6,577,472, which is a continuation of U.S. Ser. No. 09/121,531, filed Jul. 24, 1998, now abandoned.

BACKGROUND OF THE INVENTION

The present invention is concerned with a glass substrate for a magnetic disk, and were especially, it relates to a magnetic disk with a surface which has no chemical strengthening layer.

Moreover, the present invention relates to a magnetic disk whose surface roughness in an information recording portion thereof is sufficiently small, and a glass substrate for use in magnetic disk and magnetic disk that are suitable for a high density recording with high reliability. The present invention also relates to the process of manufacturing a glass substrate and a magnetic disk device.

Texturing of a glass substrate of a magnetic disk by using a laser has been attempted recently. While this method involves a technique used on metal substrates, such as Ni-P, this technique also maybe applied to glass. As described in Patent pre-publication 7-182655 and Patent prepublication 9-138942, laser texturing techniques using an ultraviolet light laser of 266 nm or a carbon dioxide laser that has a long wavelength of 10.6 $\mu$m have been used for ordinary glass having a transparency to light in the range from infrared to near ultraviolet.

In the above-described glass system, the substrate is reinforced by a chemical strengthening layer, and it is also known that texture formation maybe easily performed by compression of the substrate surface. (Ref. A. C. Tam et. al., IEEE(1997)).

SUMMARY OF THE INVENTION

As a recording medium for a note book type personal computer, a 2.5" glass substrate with a high surface smoothness is installed in a magnetic disk device. The glass substrates implemented at present are chemically strengthened glass substrates and crystallized glass substrates. However, lowering of the traveling height of the magnetic head is necessary to increase the recording capacity or recording density per unit area of the magnetic disk. Therefore, a magnetic disk with a smoother recording surface is being developed.

When the magnetic disk is rotating, the magnetic head floats on the recording surface of the disk, and, when the disk stops, the head lands on and contacts the disk. Thus, sticking may occur when the face where the head lands is too smooth. Therefore, the landing point of the heads on the disk surface must have a proper roughness. For the reason, a texture processing that makes all recording surfaces of the magnetic disk have a proper roughness has been adopted. However, in view of the requirement to provide a small traveling height, the texture should not be formed on the entire recording surface, but should be formed only in a zone (CSS zone; Contact Start Stop Zone) that is formed where the head lands (zone texturing).

A method of etching, sputtering or sol-gel coating only a CSS zone after masking the recording surface has been attempted as a method of effecting zone texturing. However, with these methods, the masking is not sufficient in some cases, and so the recording surfaces become rough to some extent, which reduces the available recording area. To solve this problem, the texture is formed by using a laser. There is a method of providing a laser texture, which is described in Japanese patent Laid-open print No. 7-182655. However, with such method, it was difficult to form the texture with a stabilized configuration and width, because the method uses a carbon dioxide gas laser and the output stability of a carbon dioxide gas laser is not satisfactory. Since the wavelength of the carbon dioxide gas laser is long (10.6 $\mu$m), the spot diameter becomes large. Therefore, it is difficult to form a small sized texture.

Sufficiently small bumps that constitute a texture are formed by using ultraviolet light in the method disclosed in Japanese patent Laid-open print No. 9-138942. In this specification, the term bump is used to describe each of a plurality of small projections that constitute the texture of the disk. Because the depth of focus is shallow in this method, focusing on the substrate surface is difficult, so that control of the bump height with a high degree of accuracy is difficult. Because ultraviolet light was absorbed in the ordinary lens system, the loss was large. This produced a difficulty and danger to operators as well, because ultraviolet light cannot be directly observed with the naked eye.

The mechanical strength of the chemically reinforced substrate is high and the formation of the laser texture is easy to achieve in this substrate, but there is a fear that alkali ions with a large ion diameter that are introduced into the glass substrate by the chemical strengthening will move to the substrate surface. As a result, the peeling of a magnetic film from the substrate or sticking may arise. A crystallized glass substrate is conceivable as an example of other strengthened substrates. In case a crystallized glass substrate is used, however, the smoothness of the recording surface is not sufficient, and so it is difficult to obtain a high recording density.

In view of the above, an object of the present invention is to provide a glass substrate with a high chemical stability and to obtain a glass substrate for a magnetic disk for forming a stable laser texture which is suitable for use as a high recording density magnetic disk as well.

Another object of the present invention is to obtain a glass substrate for a magnetic disk having a high mechanical strength with good reliability and which has no chemically reinforced layer.

A further object of the present invention is to provide a magnetic disk having high reliability and a high recording density and a magnetic disk device using the same.

The invention employs the following measures to achieve the above objects. A glass substrate for the magnetic disk of the present invention has an information recording surface to record information on at least a part of the surface thereof, but it does not have a chemical strengthening layer on the surface. The surface roughness Ra of the information recording surface is 2.0 nm or less, and there exists a wavelength zone in which the transmittance of light becomes 10% or less in the wavelength range of from 300 nm to 2000 nm. In other words, the glass substrate should have a transmittance of 10% or less to the laser light being used.

At least one transition metal element, which is selected from the group consisting of titanium, vanadium, chromium, manganese, cobalt, nickel, copper, gold and silver, is contained in the glass substrate. The transition metals are used for absorbing laser light and reducing the transmittance of the glass composition to laser light. When the transition metal element is cobalt, 1 to 30% by weight of cobalt is preferably contained on the basis of the conversion as CoO. In this case, using CoO, the wavelength zone for effecting laser texturing is in the range of from 450 to 700 nm.

The composition of the glass substrate for the magnetic disk of the present invention should contain a rare earth metal, which increases the mechanical strength of the glass substrate. An example of a preferable glass composition is: $SiO_2$: 50 to 80 weight %, $B_2O_3$: 0 to 15 weight %, $R_2O$: 0 to 20 weight % (R=alkali metal element), $Ln_2O_3$: 0 to 10 weight % (Ln=rare earth element), $Al_2O_3$: 0.5 to 15 weight CoO: 1 to 30 weight % on the basis of oxide conversion.

The magnetic disk of the present invention comprises a circular or disk-shaped glass substrate and an information recording film formed directly or through another layer on the surface of the substrate. The substrate surface has a non-information recording area and an information recording area that are formed in concentric relation to the periphery of the substrate. The surface roughness Ra of the information recording surface is 2.0 nm or less, and the maximum surface roughness Rmax is 5 nm or less. The laser texture is formed in the non-information recording area. The structure of the texture should be regularly formed. The mean height of the bumps that constitute this texture should preferably be 10 nm to 25 nm.

A chemical strengthening layer does not essentially exist in the surface part of the glass substrate. The substrate has a transmittance of 10% or less to monochromic light or laser light, such as light having a wavelength of 300 to 2000 nm.

The manufacturing process of the magnetic disk of the present invention comprises the following steps. A substrate, which has no chemical strengthening layer in the surface thereof and has a surface roughness Ra of 2.0 nm or less, is used. The texture is formed in the non-information recording area of the surface of the glass substrate by irradiating it with a laser beam having a wavelength of 300 to 2000 nm so as to form bumps having a mean height of 10 nm to 25 nm. When the glass substrate contains cobalt, the preferable wavelength to be used is 450 to 700 nm. The magnetic disk device of the present invention comprises a magnetic head, a magnetic disk, a spindle motor to rotate the magnetic disk, and a motor for changing the position of the magnetic head in a direction parallel with the surface of the magnetic disk.

The magnetic disk has a glass substrate and a magnetic film formed directly or through another layer on it. The disk surface has a non-information recording area and an information recording area. During rotation of the magnetic disk, the traveling height of the magnetic head on the information recording surface is 30 nm or less, the surface roughness Ra of the information recording surface is 2.0 nm or less, and Rmax is 5 nm or less.

A chemical strengthening layer does not exist on the surface part of the glass substrate. The substrate has a transmittance of light of 10% or less in the wavelength range of 300 to 2000 nm.

According to the present invention, because there is no chemical strengthening layer on the surface, a glass substrate for a magnetic disk that is excellent in chemical stability can be obtained. Moreover, a glass substrate for a magnetic disk on which a laser texture can be formed stably in a predetermined noninformation recording area is obtained. Therefore, a glass substrate for a magnetic disk with a high recording density is obtained. When rare earth elements are added to the substrate, a glass substrate having a high mechanical strength and a high reliability are obtained even though it does not have a chemical strengthening layer. Thus, a magnetic disk and a magnetic disk device with a high recording density and a high reliability,can be obtained.

DESCRIPTION OF THE PREFERRED EMBODIMENTS

Figure 1:
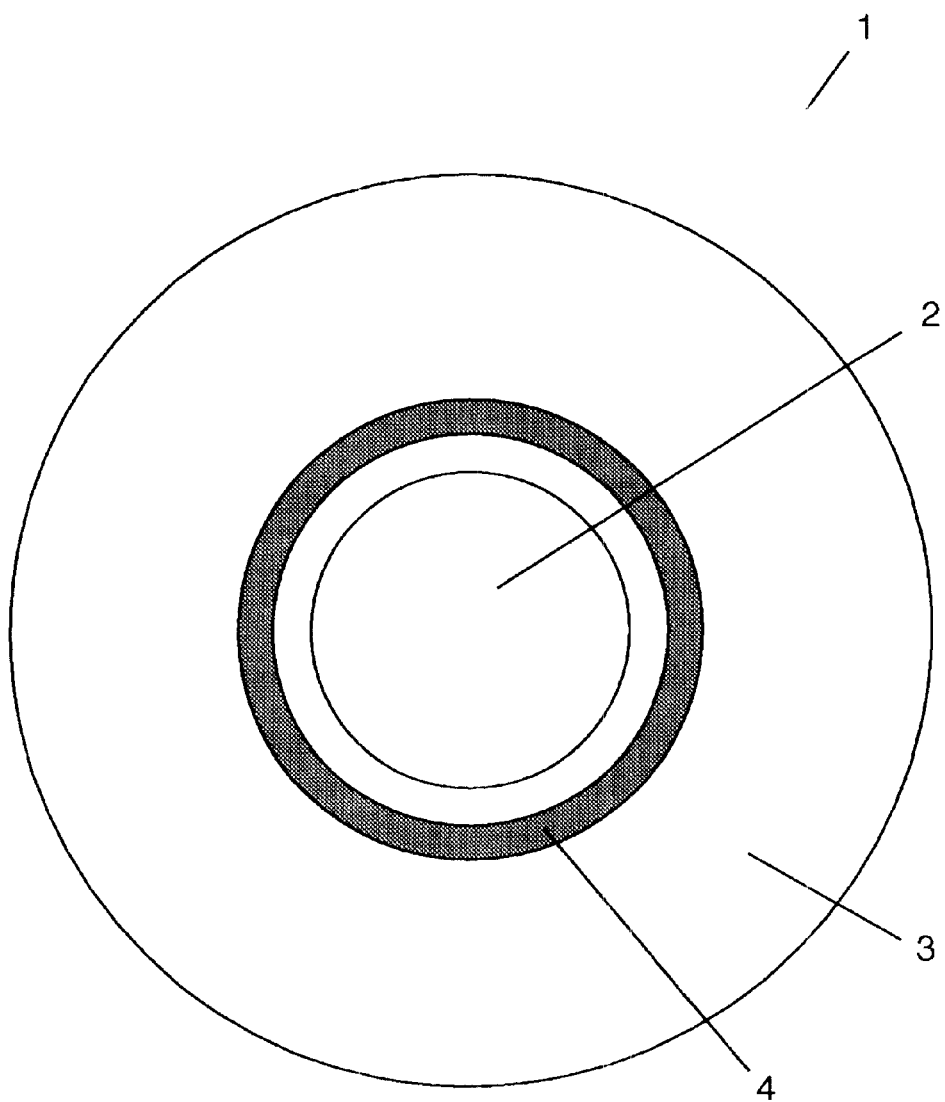
FIG. 1 is a plan view of a glass substrate for a magnetic disk according to one example of the present invention.

The present invention will be explained in detail by reference to the drawings.

EXAMPLE 1

The glass compositions of nineteen glass substrates for magnetic discs manufactured in accordance with the present invention are shown in Table 1.

TABLE 1

| | Composition (weight %) | | | | | | | | | | | | |
|---|---|---|---|---|---|---|---|---|---|---|---|---|---|
| No. | $SiO_2$ | $Na_2O$ | $Li_2O$ | $B_2O_3$ | $Al_2O_3$ | CaO | MgO | $Gd_2O_3$ | $Er_2O_3$ | CoO | NiO | FeO | remarks |
| 1 | 72.5 | 14.0 | — | — | 0.9 | 8.0 | 4.1 | 3.0 | — | 0.5 | — | — | |
| 2 | 71.5 | 13.0 | — | — | 0.5 | 7.0 | 3.0 | 3.0 | — | 5.0 | — | — | |
| 3 | 72.0 | 14.0 | — | — | 0.9 | 8.0 | 4.1 | 3.0 | — | 1.0 | — | — | |
| 4 | 51.8 | 10.0 | — | — | 1.0 | 5.7 | 2.9 | 3.0 | — | 28.6 | — | — | |
| 5 | 69.5 | 12.0 | — | — | 0.5 | 6.0 | 2.0 | 3.0 | — | 10.0 | — | — | |
| 6 | 45.3 | 8.8 | — | — | 0.9 | 5.0 | 2.6 | 3.0 | — | 37.4 | — | — | * |
| 7 | 72.5 | 14.0 | — | — | 0.9 | 8.0 | 4.1 | 3.0 | — | — | 0.5 | — | |
| 8 | 71.5 | 13.0 | — | — | 0.5 | 7.0 | 3.0 | 3.0 | — | — | 5.0 | — | |
| 9 | 72.5 | 14.0 | — | — | 0.9 | 8.0 | 4.1 | 3.0 | — | — | — | 0.5 | |
| 10 | 71.5 | 13.0 | — | — | 0.5 | 7.0 | 3.0 | 3.0 | — | — | — | 5.0 | |
| 11 | 68.5 | 10.0 | — | 5.0 | 1.0 | 7.0 | 5.0 | 3.0 | — | 0.5 | — | — | |
| 12 | 68.0 | 8.0 | — | 4.0 | 1.0 | 6.0 | 5.0 | 3.0 | — | 5.0 | — | — | |

TABLE 1-continued

| No. | SiO$_2$ | Na$_2$O | Li$_2$O | B$_2$O$_3$ | Al$_2$O$_3$ | CaO | MgO | Gd$_2$O$_3$ | Er$_2$O$_3$ | CoO | NiO | FeO | remarks |
|---|---|---|---|---|---|---|---|---|---|---|---|---|---|
| 13 | 68.0 | 10.0 | — | 6.0 | 1.0 | 7.0 | 4.0 | 3.0 | — | 1.0 | — | — | |
| 14 | 68.0 | 8.0 | — | 5.0 | 1.0 | 6.0 | 4.0 | — | 3.0 | 5.0 | — | — | |
| 15 | 66.0 | 6.0 | — | 3.0 | 1.0 | 5.0 | 4.0 | — | 10.0 | 5.0 | — | — | |
| 16 | 66.0 | 5.0 | — | 3.0 | 1.0 | 5.0 | 3.0 | — | 12.0 | 5.0 | — | — | * |
| 17 | 69.0 | 10.0 | — | 4.0 | 1.0 | 6.0 | 5.0 | — | — | 5.0 | — | — | |
| 18 | 71.5 | 13.0 | — | — | 0.5 | 7.0 | 3.0 | — | — | — | — | 5.0 | ** |
| 19 | 71.5 | 3.0 | 11.0 | — | 8.5 | 0.5 | 0.5 | — | — | 5.0 | — | — | *** |

*devitrified, chemical strengthened, *crystallized

First, a method of manufacturing a glass substrate having a composition as shown in Table 1 will be described. After weighing, combining and mixing the material powders of determined quantities in a crucible, the composition was melted at 1600 degrees centigrade in an electric furnace. After the composition was sufficiently melted, a stirrer was inserted in the molten glass, and the molten glass was stirred for about 1 hour. A glass block was obtained by pouring the molten glass into a jig after taking out the stirrer and then allowing it to stand still for 30 minutes. The glass block was reheated to a temperature in the neighborhood of the glass transition point and was annealed to remove stress. The obtained glass block was sliced with a cutter to obtain a disk configuration having a thickness of about 1.5 mm. Each disk has an inner periphery and an outer periphery in concentric relation. The inner periphery and the outer periphery of the disk were machined to level the surface with a diamond tool. Then, both sides of the substrate were lapped and polished, with a result that the glass substrates for the magnetic discs were obtained.

FIG. 1 is a plane view of the manufactured glass substrate for the magnetic disk. In FIG. 1, the magnetic disk includes a glass substrate 1 having an inner periphery 2 for chucking with a chuck, a recording surface 3, and a CSS zone 4. In this example, the thickness of the substrate was 0.635 mm. The inner periphery was 20 mm in diameter. The outer periphery was 65 mm in diameter. With the common center of the inner and outer peripheries designated 0, the CSS zone 4 was provided in an area in the range of 13 to 15 mm from the center of the disk, and a laser texture was formed therein. In Table 1, substrates No. 1 to No. 16 have glass compositions containing a rare earth element and cobalt oxide. Substrate No. 17 has a glass composition containing no rare earth element. Substrate No. 18 is formed of a chemical strengthened glass obtained by chemical strengthening the glass of substrate No. 10. Substrate No. 19 is a crystallized glass containing cobalt oxide. The glass compositions of substrates No. 6 and No. 16 did not become glass, and they were diversified immediately after casting. Therefore, these glasses are not desirable for use as substrates.

Table 2 shows the transmittance of light at various laser wavelengths of the nineteen glass substrates shown in Table 1, the three point bending strength of the base glass materials, the state of the laser texture formation, the water resistance of the substrate, the roughness Ra of the recording surface and the Vickers hardness of the substrate surface.

TABLE 2

| | 266 nm | | 532 nm | | 1064 nm | | Water resistance | Roughness (Ra/nm) | Micro Vickers hardness (Hv) | Three points bending strength ($\sigma$/KPa) | remarks |
|---|---|---|---|---|---|---|---|---|---|---|---|
| Exs. | Transmittance (%) | Texture formation | Transmittance (%) | Texture formation | Transmittance (%) | Texture formation | | | | | |
| 1 | 0.12 | Δ | 1.82 | Δ | 72.0 | X | ○ | 1.000 | 679 | 212 | |
| 2 | 0.12 | Δ | 0.06 | ○ | 2.00 | Δ | ○ | 0.895 | 680 | 222 | |
| 3 | 0.15 | Δ | 1.03 | ○ | 65.0 | X | ○ | 0.902 | 679 | 215 | |
| 4 | 0.20 | Δ | 0.02 | ○ | 0.06 | Δ | ○ | 1.960 | 682 | 221 | |
| 5 | 0.18 | Δ | 0.04 | ○ | 1.00 | Δ | ○ | 1.502 | 686 | 261 | |
| 6 | — | — | — | — | — | — | — | — | — | — | * |
| 7 | 0.17 | Δ | 40.0 | X | 70.0 | X | ○ | 0.895 | 679 | 225 | |
| 8 | 0.16 | Δ | 0.12 | Δ | 10.0 | Δ | ○ | 0.902 | 682 | 231 | |
| 9 | 0.07 | Δ | 90.0 | X | 70.0 | X | ○ | 0.878 | 680 | 284 | |
| 10 | 0.03 | Δ | 36.0 | X | 6.00 | Δ | ○ | 0.899 | 680 | 241 | |
| 11 | 0.20 | Δ | 4.00 | Δ | 70.3 | X | ○ | 0.854 | 679 | 201 | |
| 12 | 0.12 | Δ | 0.09 | ○ | 2.60 | Δ | ○ | 0.952 | 685 | 221 | |
| 13 | 0.17 | Δ | 1.06 | ○ | 64.5 | X | ○ | 0.874 | 679 | 201 | |
| 14 | 0.18 | Δ | 0.08 | ○ | 2.50 | Δ | ○ | 0.896 | 672 | 288 | |
| 15 | 0.16 | Δ | 0.08 | ○ | 2.60 | Δ | ○ | 0.874 | 686 | 315 | |
| 16 | — | — | — | — | — | — | — | — | — | — | * |
| 17 | 0.16 | Δ | 0.07 | ○ | 2.60 | Δ | ○ | 0.875 | 623 | 160 | |
| 18 | 0.06 | ○ | 0.06 | X | 2.00 | Δ | X | 0.765 | 711 | 506 | ** |
| 19 | 0.17 | Δ | 0.03 | ○ | 1.00 | Δ | X | 3.242 | 742 | 322 | *** |

*devitrified, chemical strengthened, *crystallized

In this example, the fundamental wavelength of the pulse YAG laser (1064 nm), the second harmonic generation laser (532 nm) and the fourth order harmonic generation laser (266 nm) were used for texture formation. The laser power per pulse was about 2.0 µJ. The frequency of the laser pulse was 20 kHz. The transmittance was measured by a spectrophotometer. Whether the texture was formed or not was judged by observing the substrates with an optical microscope after laser irradiation. It was also judged by evaluating the bump configuration on the substrate during examination with AFM (Atomic Force Microscopy) to determine there were traces. In Table 2, in the texture columns, circle (0) stands for the case where a good texture was formed because the traces remained, the bump configuration as determined with AFM observation was good and the dispersion of the height was small; a triangle (Δ) stands for the case where, while the traces remained, the bump configuration was not good and the control of the height was not satisfactory; and a cross mark(X) stands for the case where the traces did not remain as determined by observation with an optical microscope or AFM.

The water resistance was evaluated by measurement of the quantity of eluted components from the glass composition in the demineralized water. Each glass substrate was dipped for 24 hours at 70° C. in 80 ml demineralized water. In Table 2, in the water resistance column, O stands for the acceptable case, and X stands for not acceptable cases. The surface roughness was evaluated by using a roughness tester.

The Vickers hardness of the substrate surface was evaluated by the size of the pressure scar. A diamond indenter was applied to the surface of the substrate under the condition of 100 gf- 15s.

The three point bending strength was evaluated by using chamfered 0.635 mm×4 mm×40 mm specimens. The crosshead speed was set at 0.5 mm/minute.

The transmittance of all glass compositions was low when the laser light wavelength was 266 nm. While in the glass compositions of substrate Nos. 1 to 17 that are not chemically strengthened, traces of the texture were observed, sufficient control of height and configuration was difficult. While the traces of the texture of the comparative glass composition of substrate No. 19, which is crystallized glass, could be confirmed, the dispersion of the height was large. So a stable texture could not be formed. On the other hand, in chemical strengthened glass containing iron oxide (comparative example No. 18), a stabilized texture could be formed. A texture having a stable configuration was obtained in the soda lime glass containing 1.0 weight % or more of CoO (No.2-5) by use of a 532 nm wavelength laser.

A texture having a stable configuration was also formed by borosilicate glass (No. 12-15, and 17). It was possible to form the texture stably in the crystallized glass of comparative example No. 19. In case of the chemically strengthened glass of comparative example No. 18, traces of the texture could not be found when a 532 nm laser was used.

In case of the soda lime and borosilicate glasses containing 0.5 weight % of CoO (No. 1, 11), though a texture formation could be confirmed, a stable texture formation could not be observed. On the other hand, in glass containing NiO, the texture formation could not be confirmed when the NiO content was 0.5 weight % (No. 7). In the glass containing 5.0 weight % NiO (No. 8), formation of the texture was observed. However, it was difficult to obtain a stabilized texture. In case of the fundamental wave, texture formation was recognized in glass containing 5 weight % or more of NiO and CoO (No. 2, 4, 5, 6, 8, 12, 14, 15, 16, 17, 18 and 19). The control of the configuration of the texture was not so good and the height control of the obtained texture was difficult. In other glasses, the traces of the texture could not be recognized. The water resistance was satisfactory in the glasses of substrates No. 1-No. 17.

On the other hand, in the chemically strengthened glass of substrate No. 18, quite large amounts of K, Na and Ca, which were used for chemical strengthening the glass composition, were eluted in water, so the water resistance was not sufficient. In case of the crystallized glass of substrate No. 19, Li eluted, so that the water resistance was not sufficient. While the surface roughness was 2 nm or less in the glasses of substrates Nos. 1-18, it was 3.2 nm in the crystallized glass of substrate No. 19. The micro Vickers hardness was around 680 in the glasses of substrates Nos. 1-15 containing rare earth elements. On the other hand, it was 623 in the borosilicate glass of substrates No. 17 containing no rare earth element, which value was not good. In addition, the three point bending strength tests brought about the same result as those of the micro Vickers hardness tests. In the cases of the chemically strengthened glass and the crystallized glass, the mechanical strength was sufficiently high.

The glass substrates for the magnetic recording disk were subjected to evaluation of the possibility of texture formation by laser, chemical stability, surface roughness and mechanical strength. At first, when the laser wavelength is 266 nm, which is fourth order generation light, a stable texture could be formed only in case of the chemically strengthened glass, but it was difficult to form it in other glasses. Therefore, chemical strengthening becomes a condition of the stable formation of the laser texture for this wavelength laser.

On the other hand, it was difficult to produce a magnetic recording disk with high reliability, because there is a problem in the chemical stability of the chemical strengthening of the glass. Therefore, it is difficult to form a stable laser texture in the case of a 266 nm wavelength laser. However, the laser textures could be formed stably by a 532 nm laser from soda lime glass and borosilicate glass, each containing 1.0 weight % or more of CoO. Especially, in borosilicate glass including a rare earth element, the chemical stability and mechanical strength were sufficient. Therefore, a magnetic disk having a high reliability could be obtained. Though it was possible to form the texture stably, using a 532 nm laser, in the crystallized glass, the surface roughness was large. Therefore, as will be described later in example 2, there was a problem in the characteristics of the magnetic disk. While at the fundamental wave of 1064 nm, there are glass compositions with which it is possible to form a texture, the dispersion of the characteristics is large. It is also difficult to form a stable texture and to control the bump height in the texture.

It was necessary to add a transition metal corresponding to the laser wavelength being used. Fe was contained in the case of 266 nm, Co in the case of 532 nm, and Ni in the case of 1064 nm. It was also possible to form a laser texture only in the substrate having chemical strengthening in the case of a 266 nm laser, but the stable texture was difficult to form in case of a 1064 nm laser. From the above examination, it was concluded that in order to obtain a magnetic disk with a high reliability and to form the laser texture stably, it is desirable to form the texture by using a laser having a wavelength of 532 nm for glass containing CoO and a rare earth element.

Then, the transmittance of the glass substrate to light in the wavelength for forming the texture stably was checked by using Table 2. With respect to substrate No. 8, it was found that the configuration was unstable and the transmittance to laser light of 1064 nm was 10%. But, it was possible to form a texture. Formation of a texture was difficult when the transmittance was over 10%.

If the transmittance with respect to each wavelength is 2.0% or less, a more stable texture could be obtained. From the above, when the transmittance at each laser wavelength is 10% or less, a texture of stable configuration could be formed with height control when the transmittance was 2% or less.

Figure 2:
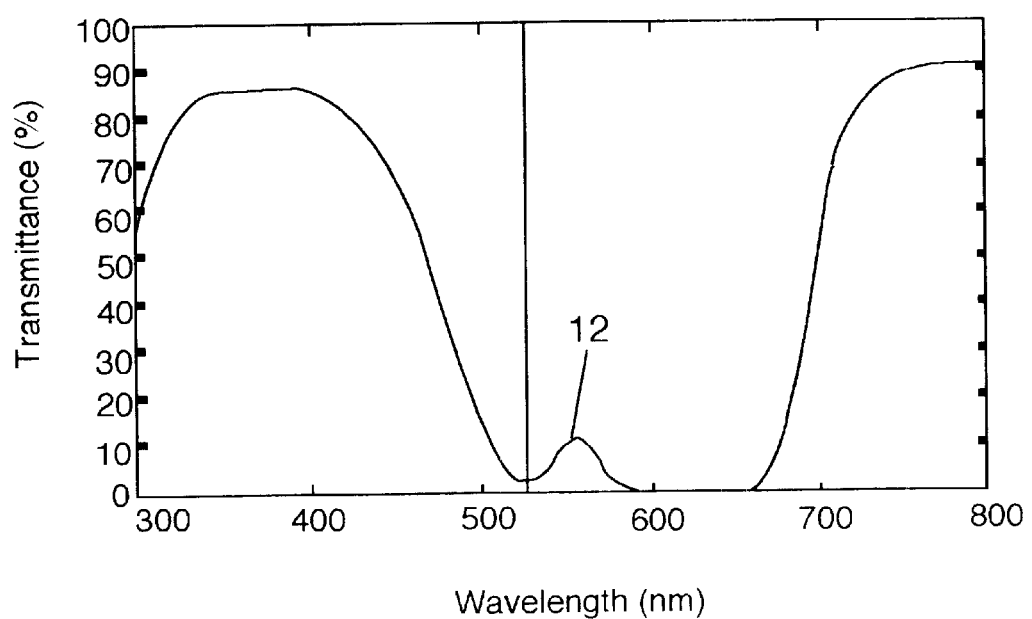
FIG. 2 is the graph that shows wavelength dependence of the transmittance of the glass substrate of the present invention.

FIG. 2 shows the wavelength dependency of the transmittance of the glass of substrate No. 12. When Co oxide is contained in the glass, it was proved that there was a large absorption of light at such wavelengths as 450 nm to 700 nm. As the CoO content increases, the transmittance in the absorption edge neighborhood declined. Then, it was proved that, when the CoO content is 13 weight %, the transmittance with respect to wavelengths of 450 nm and 700 nm became almost 0. Even if CoO is contained in larger amounts, the transmittance curve did not change. Therefore, as for the optical characteristics of the glass, an amount exceeding 13 weight % of CoO is excessive.

From Table 2, it is seen that a stable laser texture was formed when the transmittance was 2% or less. In this system, the requirements were satisfied in the range of 450 nm to 700 nm when the content of CoO was high. Therefore, it was possible to form a laser texture using any laser with a wavelength in this range. In addition, by adding copper, chromium, manganese, vanadium, titanium, etc. to the glass compositions, enough absorption of light can be effected over the range of from the near ultraviolet area to the infrared area. Light in the range of 300 nm to 400 nm was absorbed by adding vanadium. By adding an oxide of chromium, light in the range of 300 nm to 450 nm was absorbed. Light in the range of 400 nm to 700 nm was absorbed by adding nickel. Light in the range of 450 nm to 700 nm and 1000 nm to 2000 nm was absorbed by adding cobalt. Light in the range of 550 to 1500 nm was absorbed by adding copper. Light in the range of 450 nm to 800nm was absorbed by adding titanium.

Figure 3:
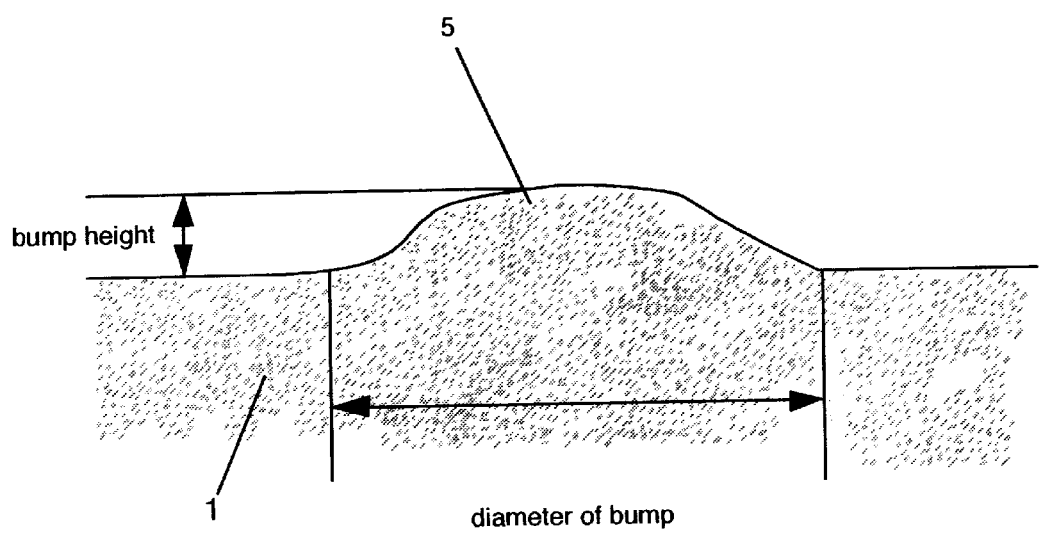
FIG. 3 is a sectional view of the shape of a bump that forms part of a laser texture manufactured on the glass substrate surface according to the present invention.

It was possible to form a laser texture in these wavelength areas. The laser texture could be formed by adding transition metal elements corresponding to each wavelength between 300 nm and 2000 nm. In the case where gold and silver are made into metal colloids in the glass, absorption of light at a specific wavelength was observed, and texture could be formed in this wavelength range. Because a rare earth metal element also absorbs light, a similar effect can be expected. The absorption by a rare earth element is very sharp because of the F—F transition of the inner shell electrons, so that laser texture processing was possible only in the very narrow wavelength range. The configuration of a bump in that laser texture manufactured in this example is shown in FIG. 3. In FIG. 3, 1 denotes a glass substrate, and 5 denotes a bump which forms part of the texture. This was obtained by observing the texture obtained in the glass of substrate No. 12 with AFM.

Figure 4:
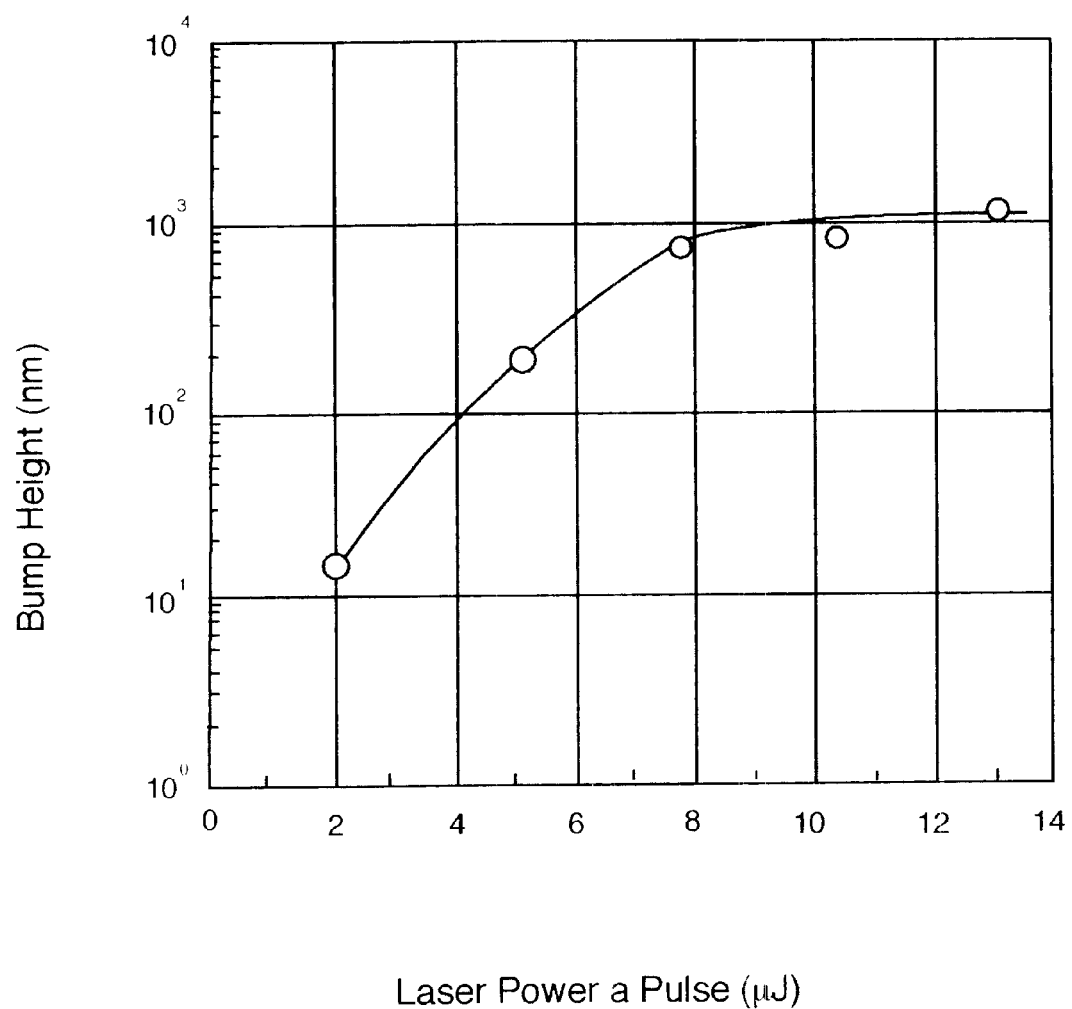
FIG. 4 is the graph that shows the height of a bump relative to the laser power per pulse.

The bump configuration obtained in this example has a dome form as shown in this figure. Observation with a SEM (Scanning Electron Microscope) revealed that the glass was melted once, and was quenched so as to re-solidify. At this time, the rate of volumetric shrinkage of the bump is smaller than that of the substrate that was manufactured by slow cooling or annealing, so that the volume of the bump becomes larger. Thus, the bump portion swells to form a bump of the dome type. By using the glass of substrate No. 12, the effect of laser power per pulse on the bump height was checked. The result is shown in FIG. 4. The bump height greatly changes as the laser power changes. The bump height was about 15 nm in the case of 2 $\mu$J of laser output, and 100 nm at the time of 5 $\mu$J. The height of 1000 nm was obtained in the case of 10 $\mu$J or more. All bumps had the dome configuration as shown in FIG. 3. The bump diameter was about 5 to 10 $\mu$m in all cases. When the frequency of the pulse was 20 kHz, the pitch between bumps was about 10 $\mu$m. Then, proper contents of the additives in the component of each glass substrate were studied. Tables 3-1 and 3-2 show the compositions of the examined glasses, the micro Vickers hardness (Hv), the eluted quantities of the components in the water resistance tests, the surface roughness (Ra/nm) of the recording surface, the presence or absence of the laser formation of texture and the presence or absence of a glass formation.

TABLE 3-1

| No. | SiO$_2$ | Na$_2$O | B$_2$O$_3$ | Al$_2$O$_3$ | CaO | Gd$_2$O$_3$ | CoO | Micro Vickers hardness (Hv) | Water resistance | Roughness (Ra/nm) | Laser texture formation | Glass formation |
|---|---|---|---|---|---|---|---|---|---|---|---|---|
| 20 | 50.2 | 15.0 | 12.4 | 14.4 | — | 3.0 | 5.0 | 653 | ○ | 1.000 | ○ | ○ |
| 21 | 49.6 | 15.4 | 12.5 | 14.5 | — | 3.0 | 5.0 | 652 | ○ | 0.895 | X | X |
| 22 | 78.8 | 7.1 | 4.1 | 2.0 | — | 3.0 | 5.0 | 743 | ○ | 0.878 | ○ | ○ |
| 23 | 80.4 | 5.7 | 3.7 | 2.2 | — | 3.0 | 5.0 | 760 | ○ | 0.899 | ○ | X |
| 24 | 59.0 | 10.6 | 10.2 | 12.2 | — | 3.0 | 5.0 | 680 | ○ | 0.854 | ○ | ○ |
| 25 | 60.6 | 9.8 | 9.8 | 11.8 | — | 3.0 | 5.0 | 734 | ○ | 0.856 | ○ | ○ |
| 26 | 60.2 | 16.3 | 14.5 | 1.0 | — | 3.0 | 5.0 | 732 | ○ | 0.895 | ○ | ○ |
| 27 | 60.1 | 15.6 | 15.7 | 0.6 | — | 3.0 | 5.0 | 720 | X | 0.902 | ○ | ○ |
| 28 | 66.1 | 18.6 | 3.7 | 3.6 | — | 3.0 | 5.0 | 680 | ○ | 0.921 | ○ | ○ |
| 29 | 65.9 | 18.2 | 4.5 | 3.4 | — | 3.0 | 5.0 | 684 | ○ | 0.895 | ○ | ○ |
| 30 | 60.3 | 20.2 | 6.5 | 5.0 | — | 3.0 | 5.0 | 724 | X | 0.944 | ○ | ○ |
| 31 | 60.7 | 19.2 | 6.8 | 5.3 | — | 3.0 | 5.0 | 732 | ○ | 0.952 | ○ | ○ |
| 32 | 74.8 | 7.2 | 5.0 | 5.0 | — | 3.0 | 5.0 | 742 | ○ | 0.874 | ○ | ○ |
| 33 | 74.8 | 6.5 | 5.4 | 5.3 | — | 3.0 | 5.0 | 748 | ○ | 0.896 | X | ○ |
| 34 | 62.1 | 14.5 | 14.8 | 0.6 | — | 3.0 | 5.0 | 665 | ○ | 0.874 | ○ | ○ |
| 35 | 62.2 | 14.6 | 14.9 | 0.3 | — | 3.0 | 5.0 | 652 | ○ | 0.956 | ○ | ○ |
| 36 | 60.9 | 19.4 | 6.9 | 4.8 | — | 3.0 | 5.0 | 662 | ○ | 0.875 | ○ | ○ |
| 37 | 66.0 | 10.0 | 9.0 | 8.0 | 2.0 | — | 5.0 | 625 | ○ | 0.765 | ○ | ○ |
| 38 | 65.8 | 9.8 | 8.8 | 7.8 | 1.8 | 1.0 | 5.0 | 692 | ○ | 0.902 | ○ | ○ |
| 39 | 65.5 | 9.0 | 8.5 | 7.5 | 1.5 | 3.0 | 5.0 | 732 | ○ | 0.600 | ○ | ○ |
| 40 | 65.3 | 8.6 | 8.3 | 7.3 | 1.5 | 4.0 | 5.0 | 725 | ○ | 0.952 | ○ | ○ |

TABLE 3-1-continued

| No. | Composition (weight %) | | | | | | | Micro Vickers hardness (Hv) | Water resistance | Roughness (Ra/nm) | Laser texture formation | Glass formation |
| --- | --- | --- | --- | --- | --- | --- | --- | --- | --- | --- | --- | --- |
| | SiO$_2$ | Na$_2$O | B$_2$O$_3$ | Al$_2$O$_3$ | CaO | Gd$_2$O$_3$ | CoO | | | | | |
| 41 | 65.1 | 8.2 | 8.1 | 7.1 | 1.5 | 5.0 | 5.0 | 736 | ◯ | 1.054 | ◯ | ◯ |
| 42 | 64.6 | 7.2 | 7.6 | 6.6 | 1.0 | 8.0 | 5.0 | 740 | ◯ | 1.455 | ◯ | ◯ |
| 43 | 63.8 | 7.6 | 6.8 | 5.8 | 1.0 | 10.0 | 5.0 | 745 | ◯ | 1.562 | ◯ | ◯ |
| 44 | 63.6 | 7.2 | 6.6 | 5.6 | 1.0 | 11.0 | 5.0 | 760 | ◯ | 1.899 | ◯ | X |

As seen in Tables 3-1 and 3-2, the micro Vickers hardness and durability was evaluated by use of the above method. The laser texture was formed on a glass substrate of 2.5" by using 532 nm laser light. Like substrate No. 21 in Table 3-1 and the glass of substrate No. 6 in Table 1, the chemical stability of the glasses was low in case of a SiO2 content of less than 50.0 weight %, so it did not form a glass. When a glass of SiO2 content of 50.0 weight % or more like the glass of substrate No. 4 in Table 1 and No. 22 in Table 3-1, a stable glass could be obtained.

While a stable glass could be obtained in substrate No. 22 in Table 31, when the SiO$_2$ content exceeded 80% like the glass of substrate No. 23, the viscosity of the glass became very high. It became a glass with a lot of cords and pores so that melting of the glass composition was difficult. From the above, it has been determined that the SiO$_2$ content of 50 to 80% is preferable. While a stable glass was obtained from the composition of substrate No. 24 in Table 3-1, the micro Vickers hardness (Hv) was low, and the mechanical strength was not sufficient. On the other hand, the Hv was 734 in the glass of substrate No. 25, and so a sufficient mechanical strength was obtained. An SiO$_2$ content of 60 weight % or more is further desirable to obtain a high mechanical strength.

On the other hand, though a stable glass could be formed in substrate No. 22, it was difficult to form a laser texture because of its high characteristic temperature. From the above, it is seen that it is desirable that the SiO$_2$ content is 60 to 75 weight % to obtain a sufficient mechanical strength and water resistance. In this range, the surface roughness can be made small, and the laser texture is formed in the glass effectively.

The laser texture could be formed without adding B$_2$O$_3$ like the glasses of substrates Nos. 1-10. But, when B$_2$O$_3$ exceeds 15 weight % like substrate No. 27 of Table 3-1, B$_2$O$_3$ was eluted in the water resistance test, and chemical stability declined. Therefore, if the B$_2$O$_3$ content is 15 weight % or less, a stable glass can be obtained. Like the glass of substrate No. 30 of Table 3-1, when the content of the sum of alkali oxides exceeds 20 weight %, the glass showed a large amount of alkali elusion.

If the sum quantity of added alkali oxides is 20 weight % or less, the alkali elusion quantity could be sufficiently small like the glass of substrate No. 31. Therefore, the content of the alkali elements should be 20 weight % or less. Because the sum quantity of the alkali oxides in the glasses of substrates No. 33 and No. 23 is 7.0 weight % or less, the characteristic temperature was too high, and it was difficult to form a texture using the laser. The alkali content was 7.0 weight % or more in substrates No. 32 and No. 22, and it was possible to form a texture using the laser. From the above, it is seen that the sum quantity of an alkali metal oxide should be 7 to 20 weight %.

When the rare earth oxides are contained in the glass composition, the mechanical strength can be improved without chemical strengthening. Like substrate No. 16 in Table 1 and substrate No. 44 in Table 3-2, when the rare earth elements exceed 10 weight %, they react with transition metal elements to cause devitrification. Therefore, the content of rare earth oxides should be 10 weight % or less. When the content of CoO is over 30 weight %, the glass was diversified like the glass of substrate No. 6. It was difficult to form a laser texture when the CoO content was less than 1.0 weight %, like substrate No. 1 and No. 11. Therefore, the content of CoO should preferably be 1 to 30 weight %. When the CoO content is over 13 weight %, the amount of CoO becomes excessive from the saturation condition of absorption of light, and a preferable CoO content is 1 to 13 weight %.

EXAMPLE 2

A magnetic disk and a magnetic disk device were manufactured using the glass substrate manufactured in example 1, and the characteristics were evaluated.

Figure 5:
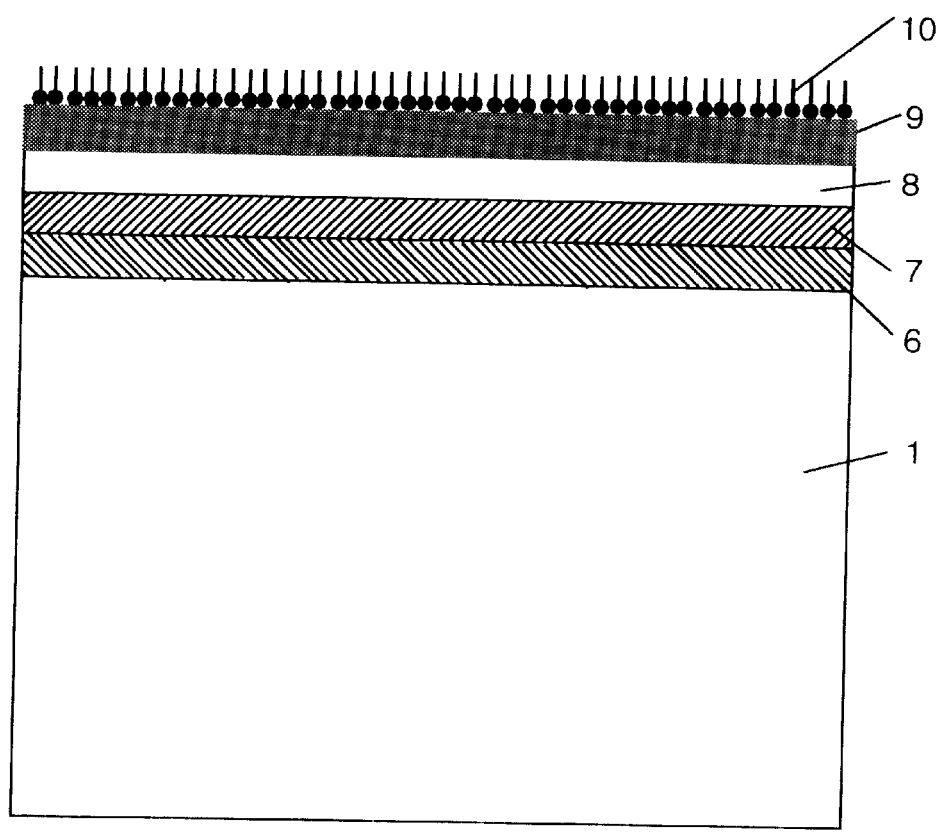
FIG. 5 is a sectional view representing an magnetic disk of the example of the present invention.

FIG. 5 shows a schematic diagram of a section of the manufactured magnetic disk, which includes a glass substrate 1, a precoat film 6 that consists of materials containing Cr, a base film 7 consisting of the CrTi materials, a magnetic film 8 consisting of the Co—Cr—Pt, an overcoat 9 consisting of carbon, and a lubricant 10. These films were manufactured on both sides of the substrate. In this example, the substrate No. 12 and the glass substrate No. 19 made of crystallized glass were used as a glass substrate, and a laser zone texture was formed in an area 13 to 15 mm from the center.

The texture was formed by using a laser of 532 nm. The bump height was changed in the range of from 5 nm to 40 nm by changing the power per pulse of the laser. After washing and drying the manufactured glass substrate, the magnetic film 8 was formed by sputtering. In this example, the pre-coat film was 22 nm, the foundation film was 25 nm, the magnetism film was 19 nm, and the protection film was 29 nm.

Figure 6:
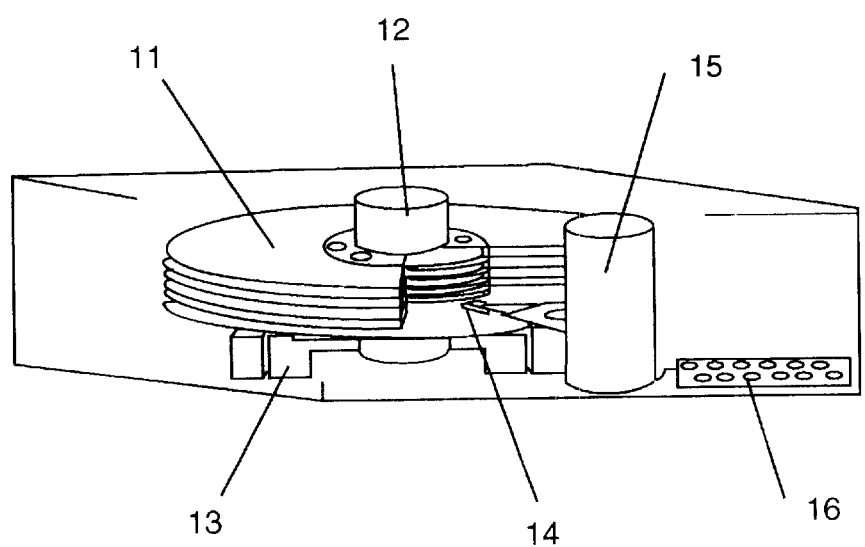
FIG. 6 is the perspective view of a magnetic disk apparatus according to the present invention.

The lubrication material was applied by dipping the disk in a lubricant solution to obtain the magnetic disk. The schematic diagram of a magnetic disk device is shown in FIG. 6. In FIG. 6, 11 denotes a magnetic disk, 12 denotes a rotation axis of the magnetic disk, 13 denotes a spindle motor, 14 denotes a magnetic head, 15 denotes a rotation axis of the magnetic head, and 16 denotes the electrical signal output terminal of an electric system.

The magnetic disk 11 is supported for rotation on axis 12, and the magnetic disk is rotated by driving the disk using the spindle motor. The magnetic head is supported on the head rotation axis and the radial position on the disk is determined by rotation of the head support around the head rotation axis. In this example, six magnetic disks were mounted in the device, and magnetic heads were mounted on the both sides of each disk to provide twelve heads in total. The thickness of the casing was 12 mm.

The traveling height of the magnetic head was controlled by the spring hardness of the arm that supports the magnetic head and the configuration of the magnetic head, which were controlled. The traveling heights of the magnetic head were set to 20 nm, 30 nm and 40 nm, respectively. The traveling height of the head in the magnetic disk equipment manufactured by using substrates of various coarseness and the record reproduction characteristics of the magnetic disk device are shown in Table 4. The Ra and Rmax of each glass substrate are also shown.

TABLE 4

| No. | Traveling height (nm) | | | Ra (nm) | Rmax (nm) |
|---|---|---|---|---|---|
| | 20 | 30 | 40 | | |
| 12 | ○ | ○ | Δ | 0.652 | 3.0 |
| | ○ | ○ | Δ | 0.821 | 3.3 |
| | ○ | ○ | Δ | 0.952 | 4.0 |
| | Δ | ○ | Δ | 1.241 | 4.4 |
| | Δ | ○ | Δ | 1.943 | 4.6 |
| | X | Δ | Δ | 2.241 | 8.4 |
| | X | Δ | Δ | 2.896 | 12.2 |
| | X | Δ | Δ | 3.358 | 30.0 |
| 19 | X | X | Δ | 3.242 | 30.0 |

C/N of the read signal was not sufficient when the head traveling height was 40 nm in any substrate. When the head traveling heights were 20 nm and 30 nm, the characteristics of surface roughness of the substrates were difficult. When the traveling height was 30 nm, the read-write characteristics of the substrate with 2 nm or less of Ra was sufficient.

The read-write characteristics of the substrate having an Ra of 2 nm or more were not satisfactory. While good read-write characteristics were obtained in the substrate having an Ra of 1 nrn or less, when the traveling height was 20 nm, good characteristics were not obtained in the substrate having an Ra of over 2 nm. A high C/N was obtained with the magnetic disk equipment using the glass substrate No. 12, and good characteristics were shown. When the crystallized glass substrate No. 19 was used, the head was damaged. This is because the Rmax of this substrate is too large (30 nm).

High C/N was obtained, when the head traveling height was 30 nm or less. When the Ra of the disk is 2.0 nm and Rmax is 5 nm or less, a traveling height of 30 nm or less could be realized. In addition, good read-write characteristics were obtained with a traveling height of 20 nm when Ra is 1 nm or less. The result of a reliability test for each bump height of the texture of the magnetic disk device using the glass substrate No. 12 is shown in Table 5.

| No. | traveling height (nm) | | | | | |
|---|---|---|---|---|---|---|
| | 5 | 10 | 15 | 20 | 25 | 30 |
| 12 | X | ○ | ○ | ○ | ○ | X |

The head traveling height was 30 nm. A start and stop operation was repeated about $10^4$ times. In Table 5, X stands for a default O and O stands for no default. When the bump height is 5 nm, the head sometimes became stuck to the magnetic disk. No default, such as head damage, occurred in the range of from 10 nm to 25 nm of bump height. On the other hand, when the head traveling height is 30 nm or more, a default, such as head damage, was observed. From the above, it is seen that it is desirable that the height of the bumps should be from 10 nm to 25 nm.

What is claimed:

1. A glass substrate for a magnetic disk, comprising:
   a glass substrate having an information recording surface which is formed in the surface of the glass substrate, wherein the surface part of the glass substrate is substantially free from a chemical strengthening layer, and wherein said glass substrate contains a rare earth element which increases the mechanical strength of the glass substrate, the rare earth element being selected from the group consisting of La, Pr, Nd, Pm, Sm, Eu, Gd, Tb, Dy, Er, Tm, Yb and Lu and being contained in an amount of 3 to 10 weight % on the basis of conversion to $Ln_2O_3$ (Ln=rare earth element), and a transition metal oxide.

2. The glass substrate for a magnetic disk according to claim 1, wherein the transition metal oxide is CoO.

3. A glass substrate for a magnetic disk according to claim 1, wherein the glass substrate contains
   SiO2: 50 to 80 weight %, $B_2O_3$: 0 to 15 weight %, $R_2O$ (the R=alkali metal element): 0 to 20 weight %, $Ln_2O_3$ (Ln=rare earth element): 3 to 10 weight %, $Al_2O_3$: 0.5 to 15 weight %; and CoO: 1 to 30 weight % on the basis of oxide conversion.

4. The glass substrate for a magnetic disk according to claim 1, wherein the rare earth element is selected from the group consisting of Gd and Er.

5. The glass substrate for a magnetic disk according to claim 1, wherein the transition metal oxide is an oxide of a transition metal element selected from the group consisting of titanium, vanadium, chrome, manganese, cobalt, nickel, copper, gold and silver.

6. The glass substrate for a magnetic disk according to claim 1, wherein the transition metal oxide is CoO and is contained in an amount of 1 to 30 weight %.

7. The glass substrate for a magnetic disk according to claim 1, wherein $Ln_2O_3$ is selected from the group consisting of $Gd_2O_3$ and $Er_2O_3$.

8. The glass substrate for a magnetic disk according to claim 1, wherein the glass substrate has a transmittance of 10% or less to light having a wavelength of 300 to 2000 nm measured when a thickness of the glass substrate is 0.635 nm.

9. A glass substrate for a magnetic disk, comprising:
   a glass substrate having an information recording surface which is formed in the surface of the glass substrate, wherein the glass substrate contains a rare earth element which increases the mechanical strength of the glass substrate, the rare earth element being selected from the group consisting of La, Pr, Nd, Pm, Sm, Eu, Gd, Tb, Dy, Er, Tm, Yb and Lu and being contained in an amount of 3 to 10 weight % on the basis of conversion to $Ln_2O_3$ (Ln=rare earth element), and a transition metal oxide.

10. The glass substrate for a magnetic disk according to claim 9, wherein the transition metal oxide is CoO.

11. The glass substrate for a magnetic disk according to claim 9, wherein the rare earth element is selected from the group consisting of Gd and Er.

12. The glass substrate for a magnetic disk according to claim 9, wherein the transition metal oxide is CoO and is contained in an amount of 1 to 13 weight %.

13. The glass substrate for a magnetic disk according to claim 12, wherein the surface part of the glass substrate is substantially free from a chemical strengthening layer.

14. The glass substrate for a magnetic disk according to claim 9, wherein $Ln_2O_3$ is selected from the group consisting of $Gd_2O_3$ and $Er_2O_3$.

15. The glass substrate for a magnetic disk according to claim 9, wherein the glass substrate has a transmittance of 10% of less to light having a wavelength of 300 to 2000 nm measured when a thickness of the glass substrate is 0.635 nm.

* * * * *